US005618503A

United States Patent [19]
Johnson et al.

[11] Patent Number: 5,618,503
[45] Date of Patent: Apr. 8, 1997

[54] ANTIMONY PENTAFLUORIDE

[75] Inventors: Alan Johnson, Oakville; H. J. Woods, Milton; H. J. Connor, Orillia, all of Canada

[73] Assignee: Chemical Research & Licensing Company, Pasadena, Tex.

[21] Appl. No.: 671,582

[22] Filed: Jun. 28, 1996

[51] Int. Cl.$^6$ .................................................. C01G 28/00
[52] U.S. Cl. ............................... 423/87; 423/489; 502/24
[58] Field of Search .............................. 502/24; 423/489, 423/87

[56] References Cited

U.S. PATENT DOCUMENTS

| | | | |
|---|---|---|---|
| 2,410,358 | 10/1946 | Perkins et al. | 23/98 |
| 3,925,251 | 12/1975 | Rodewald et al. | 252/441 |
| 4,101,640 | 7/1978 | Christe | 423/462 |
| 4,960,581 | 10/1990 | Harada et al. | 423/489 |
| 5,157,196 | 10/1992 | Crossland et al. | 585/720 |

FOREIGN PATENT DOCUMENTS 62-27306  2/1987  Japan .
62-108730  5/1987  Japan .

OTHER PUBLICATIONS

Carbonyl Difluoride: A Fluorinating Reagent For Inorganic Oxides Gupta & Shreere, Inorg. Chem, 1988, 27, 208–209.

*Primary Examiner*—Deborah Jones
*Assistant Examiner*—Amy M. Harding
*Attorney, Agent, or Firm*—Kenneth H. Johnson

[57] ABSTRACT

A method of preparing antimony pentafluoride comprising converting antimony compounds to hydroxonium fluoroantimonates by reaction of the antimony compounds with fluorinating material, such as hydrogen fluoride, in the presence of an oxidizing agent, such as hydrogen peroxide, removing water from the reaction product to concentrate the hydroxonium fluoroantimonates and reacting the hydroxonium fluoroantimonates with carbonyl difluoride to produce antimony pentafluoride. In one embodiment the hydroxonium fluoroantimonates are prepared by recovering the antimony from spent alkylation catalyst comprising $SbF_5$ deposited on silica. The silica can also be recovered and recycled to produce a remanufactured alkylation catalyst.

12 Claims, No Drawings

ANTIMONY PENTAFLUORIDE

BACKGROUND OF THE INVENTION

1. Field of the Invention

This invention relates to a method for the synthesis of antimony pentafluoride ($SbF_5$) and supported catalyst thereof. More particularly the term "synthesis" is used to include the preparation of $SbF_5$ from fresh raw materials or to recover the antimony from a spent fluoroantimonate catalyst and in effect remanufacture the catalyst using the recovered antimony.

2. Related Information

Isooctanes or trimethylpentanes (TMP) are among the most desirable components of motor alkylate gasoline and 2,2,4-trimethylpentane (isooctane) has long been the standard of measurement for the anti-knock properties of gasoline.

Motor alkylate isooctane in commercial refineries is prepared by the alkylation of isobutane with butenes in the presence of a strong acid catalyst. Two acids currently used in alkylation plants are concentrated sulfuric acid and hydrofluoric acid. The drawbacks to the use of the sulfuric or hydrofluoric acid processes are readily apparent. Large quantities of the acids, which are highly corrosive, dangerous to handle and potentially a hazard to the environment, are required. Alternative catalysts for these alkylations are safer particulate solid catalysts such as zeolites (U.S. Pat. Nos. 3,665,813 and 3,706,814); sulfated zirconia (European Patent 0174836); perfluoropolymersulfonic acid (U.S. Pat. Nos. 4,056,578 and 4,180,695) and antimony pentafluoride/acid on a carbon support (U.K. Patent 1,389,237). Other catalyst compositions which have been found to be initially active for alkylation include supported HF-antimony pentafluoride, (U.S. Pat. No. 3,852,371); a Lewis Acid and Group VIII metal intercalated in graphite, (U.S. Pat. No. 3,976,714); and a cation exchange resin complexed with $BF_3$ and HF, (U.S. Pat. No. 3,879,489). U.S. Pat. No. 4,918,255 describes a process for alkylating isoalkanes with olefins using a Lewis acid such as boron trifluoride, boron trichloride, antimony pentafluoride or aluminum trichloride deposited on inorganic oxide such as a wide pore zeolite, $SiO_2$ or $Al_2O_3$. Japanese Patent Application 85/251672 discloses the production of hexafluoroantimonate salts by the addition of hydrogen peroxide to a reaction mixture of HF and $Sb_2O_3$ and reaction with acidic NaF.

Antimony pentafluoride is a desirable catalyst for alkylation because liquid acids are eliminated, however, spent catalyst can require handling and disposal. In addition antimony pentafluoride is expensive and the supply sources limited.

U.S. Pat. No. 5,157,196 discloses a process utilizing a catalyst comprising an acid washed silica treated with antimony pentafluoride and subsequently treated with isoalkane at low temperature used for paraffin alkylation by passing the alkane-catalyst mixture through a plug flow reactor where a minor amount of olefin is introduced to contact the alkane-catalyst mixture and react to form alkylate and the alkane-catalyst-alkylate mixture is passed through the reactor with a minimum of back mixing to restrict the reaction of alkylate with olefin, thus substantially preventing polymerization. Results of up to five barrels of alkylate per pound of catalyst have been reported.

It is a particular feature of the present invention that $SbF_5$ may be recovered from spent catalyst and used as the source of antimony for the process of preparing $SbF_5$.

SUMMARY OF THE INVENTION

Briefly the present invention is a method of preparing antimony pentafluoride comprising reacting hydroxonium fluoroantimonate with carbonyl difluoride to produce antimony pentafluoride. Preferably the hydroxonium fluoroantimonates are prepared by converting antimony compounds to the pentavalent state with an oxidizing agent, for example hydrogen peroxide, then further treating the pentavalent antimony with a fluorinating material such as HF. The hydroxonium fluoroantimonates are concentrated by fractionation to remove water.

In one embodiment the present invention is a method of preparing antimony pentafluoride comprising reacting an antimony (III) compound, such as the oxide with hydrogen peroxide and hydrogen fluoride to produce a reaction product comprising an aqueous solution of pentavalent antimony compounds comprising hydroxonium fluoroantimonates, fractionating the reaction product to concentrate the hydroxonium fluoroantimonates and reacting the hydroxonium fluoroantimonates with carbonyl difluoride to produce antimony pentafluoride.

PREFERRED EMBODIMENTS

Manufacture starts with acidic aqueous solutions containing pentavalent antimony species such as $SbF_6^-$ and fluoride ions, with the counter ion being the hydrated proton for example:

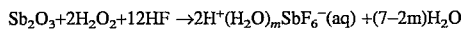

$$Sb_2O_3 + 2H_2O_2 + 12HF \rightarrow 2H^+(H_2O)_m SbF_6^-(aq) + (7-2m)H_2O$$

Evaporation of the water gives a mixed product containing the hexafluoroantimonate anion ($SbF_6^-$) and various hydroxyl substituted fluoroantimonates ($SbF_n(OH)_{(6-n)}^-$ with the hydrated proton as the cation ($H^+(H_2O)_m$). The removal of water by fractionation must be carried out to remove as much water as possible but without the evolution of HF which indicates a break down of the hydroxonium fluoroantimonates.

The mixed product can be converted to hydroxonium hexafluoroantimonates ($H^+(H_2O)_m SbF_6^-$ where m=1–2) by treatment with hydrogen fluoride. This material in turn can be converted to $SbF_5$ by reaction with carbonyl difluoride ($COF_2$):

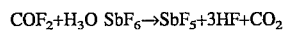

$$COF_2 + H_3O\ SbF_6 \rightarrow SbF_5 + 3HF + CO_2$$

The manufactured or remanufactured $SbF_5$ is then deposited onto a silica support. The silica may be silica recovered from the spent alkylation catalyst.

The general process of antimony pentafluoride preparation may also be used to recover or remanufacture spent silica supported antimony pentafluoride. The spent catalyst is water washed to dissolve the antimony compounds. The aqueous solution should be treated to remove organic compounds, that may have been associated with the catalyst from its previous use. The removal of organics may be achieved by extracting the aqueous solution with a suitable solvent, such as methylene chloride and purged with a gas, preferably an inert gas, such as nitrogen. The recovered aqueous solution contains Sb(III) compounds which are then converted to Sb(V) as described above.

The silica may be recovered after the aqueous solution is removed, and the fines preferably removed. The residual organic compounds may be removed by heating the silica at 200°–800° C., preferably with a gas purge. Air and an inert gas such as nitrogen are suitable for the purge, preferably with the inert gas first to avoid explosion hazards.

Example 1

Conversion of $H_3OSbF_6$ to $SbF_5$ using $COF_2$ $H_3OSbF_6$ is prepared according to U.S. Pat. No. 4,101,640 by adding 0.15 g of water to a mixture of $SbF_5$ (1.8 g) and anhydrous HF (8 mL) chilled to $-196°$ C. The mixture is warmed to room temperature and all volatile material removed in vacuo.

$COF_2$ is prepared by adding a solution of triphosgene (12.5 g) in acetonitrile (23.3 g) to a stirred slurry of sodium fluoride (13.5 g) in acetonitrile (15 mL) at 35° C. The produced vapors are passed through a packed reflux condenser cooled to $-40°$ C. to return condensibles to the reaction flask. $COF_2$ is then condensed in a collection vessel at $-196°$ C. The $COF_2$ product is transferred by cooling an evacuated storage vessel to $-196°$ C. and allowing the collection vessel to warm to $-78°$ C.

$H_3OSbF_6$ (1.32 g) is loaded into a ⅜" aluminum tube fitted with a ⅛" tube to allow gas purge through the solid and attached to a receiver cooled to $-78°$ C. The tube is heated to 200° C. then $COF_2$ gas is flowed through the ⅛" tube into the reactor at approximately 1.3 mL/min. The composition of the gas leaving the receiver is monitored for $CO_2$ and $COF_2$ content by a gas chromatograph and the flow rate determined by piston displacement. The temperature is increased and the exit gas composition and volume recorded in Table 1.

TABLE 1

| Time | 10:30 | 11:45 | 12:05 | 12:45 | 13:20 | 13:45 | 14.20 | 15:00 | 15:30 |
|---|---|---|---|---|---|---|---|---|---|
| REACTOR: Temp., °C. | 200 | 224 | 321 | 325 | 326 | 324 | 325 | 325 | 325 |
| EXIT GAS: Cumulative vol., ml | 0 | 94 | 135 | 158 | 182 | 228 | 278 | 343 | 403 |
| Composition, % | | | | | | | | | |
| $CO_2$ | | 6.8 | 30.4 | 66.7 | 86 | 68.7 | 99.4 | 35.2 | 9.4 | 5.5 |
| $COF_2$ | | 93.2 | 69.6 | 33.3 | 24 | 31.3 | 0.4 | 64.8 | 90.6 | 94.5 |

As the reaction proceeded, vapor $SbF_5$ and HF distilled from the reactor and condensed in the receiver. At the completion of the reaction there is 0.04 g of residue in the reactor and 1.54 g of condensible product in the receiver. The liquid product is distilled from the receiver and the fractions recorded in TABLE 2.

TABLE 2

Distillation Data

| | Pot Temp., °C. | Wt., g | Est. Density g/cc |
|---|---|---|---|
| 1st Distillate (HF) | 20–85 | 0.23 | — |
| 2nd Distillate (mixture) | 80–120 | 0.19 | 1.27 |
| 3rd Distillate ($SbF_5$)* | 140–160 | 0.88 | 3.03 |

*$SbF_5$ boils at 141° C., has a density of 3.1 g/cc at 25° C., and contains 56.17 wt % Sb.

Example 2

An alkylation catalyst prepared from silica and $SbF_5$ in accordance with U.S. Pat. No. 5,190,904 was used to alkylate isobutane with a mixture of primarily $C_4$ olefins. After alkylation activity had declined to a low level, the catalyst was withdrawn from the unit, washed with isobutane and residual isobutane retained on the catalyst evaporated off.

CATALYST EXTRACTION 101.44 grams of this isobutane free spent catalyst were divided into two portions for extraction. 50.78 grams were used in the first instance and 50.66 grams used in the second instance.

The catalyst was loaded onto a glass wool plug in a 1½" I.D. (Area=11.4 cm²) Teflon tube fitted with inlet and outlet valves. For the first extraction, cold water (15° C., 250.28 g) was added then nitrogen pressure was used to drive the water through the catalyst in less than 2 minutes. For the second extraction further water (252.45 g) was added and the slurry mixed for 5 minutes before removing the water and purging out the excess liquid with nitrogen. Two aliquots of acetone (each 250 mL) were then used to wash water and soluble organic material from the solid residue. A similar extraction procedure was followed with the second (50.66 g) sample of dried spent catalyst. Details are shown in Table 3.

The two solid residues (69.79 g) were dried by purging with $N_2$, then combined and dried further by an overnight purge with $N_2$ at room temperature to yield 35.36 g of a purple solid.

PROCESSING THE EXTRACTS

The two first aqueous extracts were individually analyzed for Sb(III) and Sb(V) content and found to represent 88.50% of the antimony originally in the spent catalyst. These aqueous extracts were then combined to give 451.14 g which was extracted with methylene chloride to separate organic material carried off the spent catalyst with the water, then purged with $N_2$ to leave 430.11 g of organics free aqueous extract. After retaining samples for analyses the majority (418.90 g) of these combined aqueous extracts was subjected to oxidation and fractional distillation at atmospheric pressure.

The two second aqueous extracts were combined and analyzed. The four acetone extracts were combined, evaporated down, then methylene chloride was added to separate the organic and aqueous phases. The aqueous phase was titrated for Sb(III) and Sb(V) (Table 3). These fractions were not processed with the above extracts.

OXIDATION AND FRACTIONATION

To the above combined aqueous extract (418.9 grams) was added 30% aqueous $H_2O_2$ (6.5 grams), sufficient to oxidize all the Sb(III) to the Sb(V) oxidation state, together with 48% aq. HF (36.15 grams). A 200 mL distillation pot was charged with 109.83 grams of this mixture and heated to boiling. The distillate was taken off through an 18"×¾" I.D. packed column. Initial operation was head temperature 100.5° C., pot temperature 103.2° C. As distillation proceeded the remaining extract was gradually introduced to the distillation vessel. The distillation was continued to a final overhead temperature of 107.2° C. and pot temperature 126.9° C. The residue in the distillation pot was 92.7 g containing 26.71% Sb(V) (Sb(III) was not detected). Overheads were 0.58% HF in water.

This atmospheric distillation residue was further flash distilled under vacuum (75 mm Hg) to a pot temperature of 68.7° C. and 26.63 grams of distillate were condensed containing 34 wt % HF and 0.06% soluble Si. The residue was calculated to have the approximate composition $H(H_2O)_{5.53}SbF_{6.0}$

CONVERSION OF VACUUM STILL RESIDUE TO $SbF_5$ 19.92 grams of the above vacuum still residue were transferred to a 300 mL aluminum pressure vessel and pressured with carbonyl difluoride to 250 psig at ambient temperature (14.75 grams). Immediate reaction occurred and after 30 minutes the vessel pressure was slowly reduced to 2 psig. Carbon dioxide was the major component of the discharged gas. The reactor was repressurized with $COF_2$ to 280 psig (17.39 g) sealed and heated slowly to 150° C. then held at this temperature for 80 minutes. After cooling and discharging the gaseous phase, the residual liquid was distilled from the reaction vessel giving 1st Fraction=9.16 grams predominantly HF 2nd Fraction=14.11 grams d=2.69, Sb(V)=49.73%= 87.9% $SbF_5$ Residue=0.46 grams indicating a recovery of approximately 93% of the Sb in the 2nd Fraction and having a calculated composition $SbF_5 \cdot 1.48$ HF.

Example 3

The vacuum distillation residue of Example 2 (39.90 grams) was further distilled at 75 mm Hg vacuum until a base temperature of 131.8° C. was reached. 7.44 g of distillate were recovered containing 34.1 wt % HF. The residue had the approximate composition $H(H_2O)_{2.2} SbF_{5.01}(OH)_{0.99}$.

Example 4

150.16 grams of an atmospheric residuum material produced by a similar procedure of water extraction and oxidation to Example 2 was further vacuum distilled to a final pot temperature of 151.6° C. at 100 mm Hg. The residue was 64.32 grams. A second similar procedure with a charge of 157.36 grams gave 62.45 grams of residue.

The combined residues contained 46.25% Sb and had an approximate composition $H(H_2O)_{1.75} SbF_{5.29}(OH)_{0.71}$.

60.22 grams of this material was transferred to a 300 mL aluminum vessel and pressurized to 270 psig with carbonyl difluoride and left at 125° C. overnight. On cooling, neither carbonyl difluoride nor carbon tetrafluoride were detected in the gas phase and after reducing the pressure to approximately 0 psig, a second charge of $COF_2$ to 270 psig was added. Heating at 150° C. for a similar period gave a gas phase with just 0.3% $COF_2$ and 1.1% $CF_4$. Again the reactor was vented then repressurized to 270 psig with $COF_2$, reheating to 150° C. for 3.5 hours, gave a gas phase analysis of $COF_2$=1.1%, $CF_4$=22.0%, indicating $COF_2$ was now being converted to $CF_4$.

After removing the gaseous phase from the reactor chilled to −78° C., the liquid was fractionated through a column packed with aluminum rings. HF (23.17 g) was recovered at atmospheric pressure and an $SbF_5$ fraction (46.68 grams) under vacuum. Refractionation gave a sample of pure $SbF_5$ indistinguishable from current commercial $SbF_5$ as an alkylation catalyst component.

Data from a simple laboratory scale test unit:

| Lab No. | $SbF_5$ | $SiO_2$ | Catalyst Life (bbl/lb) |
|---|---|---|---|
| 195-7 | Recovered | Commercial | 5.1 |
| 194-62 | Commercial | Commercial | 4.5 |

Both alkylation catalysts were prepared as in U.S. Pat. No. 5,190,904 using similar reagents for both preparations except the $SbF_5$. Feedstocks were CP Grade materials. Identical conditions were used for the alkylations.

Example 5

Reuse of Silica

The crude recovered silica from Example 2 (35.38 g) was sieved and the 60–80 mesh fraction recovered (65.4%) and this material heated, purged first with nitrogen to 340° C. then with air to 525° C. and finally heated at 600° C., 90.6% was recovered as a free flowing white material containing 4.8% Sb.

Alkylation catalysts were prepared with this support using both commercial and recovered $SbF_5$ using the method in Example 4, they were again tested for alkylation activity as in Example 4.

| Lab No. | $SbF_5$ | $SiO_2$ | Catalyst Life (bbl/lb) |
|---|---|---|---|
| 11-7 | Recovered | Commercial | 5.3 |
| 11-22 | Recovered | Recovered | 4.9 |
| 194-62 | Commercial | Commercial | 4.5 |

Example 6

Antimony Pentafluoride from Antimony Trioxide 67.74 g of Antimony trioxide ($Sb_2O_3$) was carefully added to 113.61 grams of 49.1 wt % HF solution and the mixture stirred to complete solution of the $Sb_2O_3$. A small amount of insoluble material separated out and the bulk solution was decanted from this residual precipitate and associated liquid (1.27 grams).

180.01 grams of this solution was transferred to a 250 mL round bottomed flask and about 1% excess of 30 wt % $H_2O_2$ solution (53.17 grams) added slowly such that the temperature was maintained between 60°–80° C. When addition was complete the temperature was increased to 90° C. for approximately 15 minutes.

The liquid was distilled under atmospheric pressure to leave a residue of 139.52 grams which analyzed approximately $H(H_2O)_{3.82} SbF_6$.

96.87 grams of this residue was vacuum distilled to a pot temperature of 130° C. 25 mm Hg. to remove 21.84 grams of distillate and leave a residue of approximate composition $H(H_2O)_{1.1} SbF_{4.23}O_{0.63}(OH)_{0.51}$, a fluorine deficient product.

Treatment with anhydrous HF and subsequent vacuum distillation at 75 mm Hg to a 150° C. pot temperature gave a residue product corresponding to $H(H_2O)_{1.84} SbF_{5.6}(OH)_{0.4}$.

21.24 grams of this concentrate were placed in a 300 mL aluminum pressure vessel, 7.40 grams of anhydrous HF added and 250 psig of $COF_2$ pressure applied (15.26 g). The reaction was warmed to 150° C. and held at this temperature for 80 minutes. The final gas analysis was $N_2$=3.2%, $CF_4$=1.5% $CO_2$=89.1% $COF_2$=6.3% indicating complete reaction. After venting the gas pressure, the remaining liquid was flashed over at reduced pressure and collected in two fractions.

|  | Fraction 1 | Fraction 2 |
|---|---|---|
| Fraction, wt., g | 15.77 | 9.33 |
| Density, g./cc | 1.48 | 2.96 |
| Sb(III), wt % | 0 | 0 |
| Sb (ICP), wt. % | 21.73 | 52.76 |
| Calc. $SbF_5$(ICP), grams | 6.10 | 8.76 |
| % Sb Recovered as $SbF_5$ = 86.9% | | |

TABLE 3

| | \multicolumn{7}{c}{SPENT CATALYST EXTRACTION RESULTS} |
|---|---|---|---|---|---|---|---|
| | 1st Sample | 2nd Sample | Σ 1 + 2 | Combined Samples | Wt ICP/Si | % Sb(III) | Sample Sb(V) |
| Spent Catalyst | 50.78 g | 50.66 g | 101.44 g | | 15.35 | 6.28 | 21.43 |
| 1st Water Wash | 250.28 g | 250.09 g | 500.37 g | | | | |
| 1st Aq. Extract (a) | 226.90 g | | | | | 1.30 | 4.31 |
| 1st Aq. Extract (b) | | 229.61 g | 456.51 g | 451.13 g | | 1.29 | 4.38 |
| Combined 1st Aq. Extract (After $CH_2Cl_2$ Extraction & Purging) | | | | 430.11 g | 0.196 | 1.36 | 4.66 |
| 2nd Water Wash | 252.45 g | 253.33 g | 505.81 g | | | | |
| 2nd Aq. Extract | 256.71 g | 257.01 g | 513.72 g | | | | |
| Combined 2nd Aq. Extract | | | | 513.72 g | | 0.08 | 0.24 |
| 1st Acetone Wash | 250 mL | 250 mL | 500 mL | | | | |
| 1st Acetone Extract | 201.18 g | | | | | | |
| 2nd Acetone wash | 250 mL | 250 mL | 500 mL | | | | |
| 2nd Acetone Extract | 195.59 g | | | | | | |
| Combined Acetone Extract | | | | 781.59 g | | | |
| Water fraction from Acetone | 20.17 g | | | | | 0.07 | 0.37 |

The invention claimed is:

1. A method of preparing antimony pentafluoride comprising reacting hydroxonium fluoroantimonates with carbonyl difluoride to produce antimony pentafluoride.

2. A method of preparing antimony pentafluoride comprising converting pentavalent antimony compounds to hydroxonium fluoroantimonates by reaction with fluorinating material, recovering the hydroxonium fluoroantimonates by fractionation and reacting the hydroxonium fluoroantimonates with carbonyl difluoride to produce antimony pentafluoride.

3. The method according to claim 2 wherein said fluorinating material comprises hydrogen fluoride.

4. A method of preparing antimony pentafluoride comprising reacting an antimony (III) compound, with an oxidizing agent and hydrogen fluoride to produce a reaction product comprising an aqueous solution of pentavalent antimony compounds comprising hydroxonium fluoroantimonates, fractionating the reaction product to concentrate the pentavalent antimony compounds, and reacting the hydroxonium fluoroantimonates with carbonyl difluoride to produce antimony pentafluoride.

5. The method according to claim 4 wherein said antimony (III) compound comprises an oxide.

6. The method according to claim 4 wherein said oxidizing agent comprises hydrogen peroxide.

7. A method of remanufacturing silica supported antimony pentafluoride catalyst comprising:

water washing a spent silica supported antimony pentafluoride catalyst, recovering an aqueous solution containing antimony (III) compound, reacting the antimony (III) compound, with hydrogen peroxide and hydrogen fluoride to produce a reaction product comprising an aqueous solution of pentavalent antimony compounds comprising hydroxonium fluoroantimonates, fractionating the reaction product to concentrate the pentavalent antimony compounds, and reacting the hydroxonium fluoroantimonates with carbonyl difluoride to produce antimony pentafluoride recovering the silica and depositing said antimony pentafluoride thereon.

8. The method according to claim 7 wherein said aqueous solution is extracted to remove organic compounds.

9. The method according to claim 7 wherein said silica is purged with a gas.

10. The method according to claim 9 wherein said gas comprises an inert gas.

11. The method according to claim 10 wherein said gas comprises nitrogen.

12. The method according to claim 9 wherein the temperature is between 200° and 800° C.

* * * * *